US012681177B2

(12) United States Patent
Nagata

(10) Patent No.: US 12,681,177 B2
(45) Date of Patent: Jul. 14, 2026

(54) DISTANCE MEASUREMENT DEVICE AND DISTANCE MEASUREMENT METHOD

(71) Applicant: Nuvoton Technology Corporation Japan, Kyoto (JP)

(72) Inventor: Tomohito Nagata, Kyoto (JP)

(73) Assignee: Nuvoton Technology Corporation Japan, Kyoto (JP)

( * ) Notice: Subject to any disclaimer, the term of this patent is extended or adjusted under 35 U.S.C. 154(b) by 439 days.

(21) Appl. No.: 18/392,586

(22) Filed: Dec. 21, 2023

(65) Prior Publication Data

US 2024/0125932 A1     Apr. 18, 2024

Related U.S. Application Data

(63) Continuation of application No. PCT/JP2022/023093, filed on Jun. 8, 2022.

(30) Foreign Application Priority Data

Jun. 30, 2021     (JP) ................................. 2021-108613

(51) Int. Cl.
| | |
|---|---|
| *G01S 17/10* | (2020.01) |
| *G01S 7/4914* | (2020.01) |
| *G01S 17/89* | (2020.01) |

(52) U.S. Cl.
CPC ............ *G01S 17/10* (2013.01); *G01S 7/4914* (2013.01); *G01S 17/89* (2013.01)

(58) Field of Classification Search
CPC ...... G01S 17/894; G01S 17/10; G01S 7/4863; G01S 7/4865; G01S 7/4914; G01S 7/4915; G01S 17/89
See application file for complete search history.

(56) References Cited

U.S. PATENT DOCUMENTS

| | | | |
|---|---|---|---|
| 11,906,669 B2 * | 2/2024 | Nagata | ................. G01S 7/4865 |
| 12,189,031 B2 * | 1/2025 | Masuda | ............... G01S 7/4865 |

(Continued)

FOREIGN PATENT DOCUMENTS

| | | | | |
|---|---|---|---|---|
| JP | 2011155702 A | * | 8/2011 | |
| JP | 6485675 B1 | * | 3/2019 | ........... G01S 17/894 |

(Continued)

OTHER PUBLICATIONS

Extended European Search Report dated Aug. 16, 2024 issued in the corresponding European Patent Application No. 22832751.6.
(Continued)

*Primary Examiner* — Jacob Y Cho
(74) *Attorney, Agent, or Firm* — Rimon P.C.

(57) ABSTRACT

A distance measurement device determines, out of pixels, first pixels that are readout targets and second pixels that are not readout targets; performs, on each of the first pixels, exposure operations of n types at different timings where n is an integer of at least 4; and reading out signal charges of n types to n packets in each of vertical transfer portions, the signal charges of the n types being generated through the exposure operations of the n types. Within a region in which the vertical transfer portions are disposed, a first region in which the n packets are created is adjacent to a pixel region in which m pixels are consecutively disposed in a vertical direction where m is an integer of at least 3. The m pixels include at least one of the first pixels and at least one of the second pixels.

13 Claims, 9 Drawing Sheets

(56)     References Cited

U.S. PATENT DOCUMENTS

| | | | | |
|---|---|---|---|---|
| 2011/0242378 A1* | 10/2011 | Mabuchi | ............... | H10F 39/803 |
| | | | | 348/E5.091 |
| 2015/0092019 A1 | 4/2015 | Asano et al. | | |
| 2018/0053799 A1 | 2/2018 | Otani et al. | | |
| 2019/0280030 A1 | 9/2019 | Kuwahara et al. | | |
| 2021/0160446 A1 | 5/2021 | Otani et al. | | |
| 2024/0125935 A1* | 4/2024 | Nakamura | .............. | G01S 17/89 |

FOREIGN PATENT DOCUMENTS

| | | | | | |
|---|---|---|---|---|---|
| JP | 7137735 B1 * | 9/2022 | ........... | G01S 7/4914 |
| WO | 2014/002415 A1 | 1/2014 | | |
| WO | 2016/189808 A1 | 12/2016 | | |
| WO | 2018/101049 A1 | 6/2018 | | |
| WO | WO-2023276594 A1 * | 1/2023 | ............... | G01C 3/06 |

OTHER PUBLICATIONS

International Search Report dated Aug. 30, 2022 issued in International Patent Application No. PCT/JP2022/023093, with English translation.

* cited by examiner

DISTANCE MEASUREMENT DEVICE AND DISTANCE MEASUREMENT METHOD

CROSS REFERENCE TO RELATED APPLICATIONS

This is a continuation application of PCT International Application No. PCT/JP2022/023093 filed on Jun. 8, 2022, designating the United States of America, which is based on and claims priority of Japanese Patent Application No. 2021-108613 filed on Jun. 30, 2021. The entire disclosures of the above-identified applications, including the specifications, drawings and claims are incorporated herein by reference in their entirety.

FIELD

The present disclosure relates to a distance measurement device that generates distance images and a distance measurement method for generating distance images.

BACKGROUND

Conventionally, various techniques have been proposed as distance measurement devices (refer to Patent Literatures (PTLs) 1, 2, and 3).

CITATION LIST

Patent Literature

PTL 1: International Publication No. WO2014/002415
PTL 2: International Publication No. WO2016/189808
PTL 3: International Publication No. WO2018/101049

SUMMARY

Technical Problem

However, with conventional distance measurement devices, if pulse durations for light emission and exposure are increased, distance measurement variations increase although distance measurement ranges can be increased. Distance measurement variations herein are variations that occur in repeated measurements, and increase in proportional to pulse durations.

In view of this, the present disclosure is to provide a distance measurement device and a distance measurement method that can increase distance measurement ranges and decrease distance measurement variations.

Solution to Problem

In order to provide such a distance measurement device, a distance measurement device according to an aspect of the present disclosure includes: a light source that emits pulsed light; a solid-state imaging device; and a control circuit. The solid-state imaging device includes: pixels that generate signal charges through photoelectric conversion; vertical transfer portions at which packets that hold and transfer the signal charges are created; and vertical transfer electrodes of plural types that cover the vertical transfer portions and create the packets. The pixels include first pixels that are readout targets and included in a predetermined frame, and second pixels that are not readout targets and not included in the predetermined frame. The control circuit controls, for the first pixels, exposure operations of n types performed at different timings relative to the pulsed light, and reads out signal charges of n types to n packets at each of the vertical transfer portions out of the packets where n is an integer of at least 4, the signal charges of the n types being generated through the exposure operations of the n types. Within a region in which the vertical transfer portions are disposed, a first region in which the n packets are created is adjacent to a pixel region in which m pixels are consecutively disposed in a vertical direction where m is an integer of at least 3, and the m pixels include at least one of the first pixels and at least one of the second pixels.

A distance measurement method according to an aspect of the present disclosure is a distance measurement method for use in a distance measurement device that includes a light source that emits pulsed light and a solid-state imaging device, the distance measurement method including: determining first pixels that are readout targets and second pixels that are not readout targets; controlling, for the first pixels, exposure operations of n types performed at different timings relative to the pulsed light where n is an integer of at least 4; and reading out signal charges of n types to n packets at a vertical transfer portion in the solid-state imaging device, the signal charges of the n types being generated through the exposure operations of the n types. Within a region in which the vertical transfer portion is disposed, a first region in which the n packets are created is adjacent to a pixel region in which m pixels are consecutively disposed in a vertical direction where m is an integer of at least 3, and the m pixels include at least one of the first pixels and at least one of the second pixels.

Note that these general and specific aspects may be implemented using a system, a method, an integrated circuit, a computer program, a computer-readable recording medium such as a CD-ROM, or any combination of systems, methods, integrated circuits, computer programs, or recording media.

Advantageous Effects of Invention

A distance measurement device and a distance measurement method according to the present disclosure can increase distance measurement ranges and decrease distance measurement variations.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

In the following, embodiments of a distance measurement device and a distance measurement method according to an aspect of the present disclosure are to be specifically described with reference to the drawings.

Note that the embodiments described below each show a general or specific example of the present disclosure. The numerical values, shapes, materials, elements, the locations and connection of the elements, steps, the processing order of the steps, and others indicated in the following embodiments are mere examples, and therefore are not intended to limit the present disclosure. Thus, among the elements in the following embodiments, elements not recited in any of the independent claims that show the broadest concepts are described as arbitrary elements.

Embodiment 1

Figure 1:
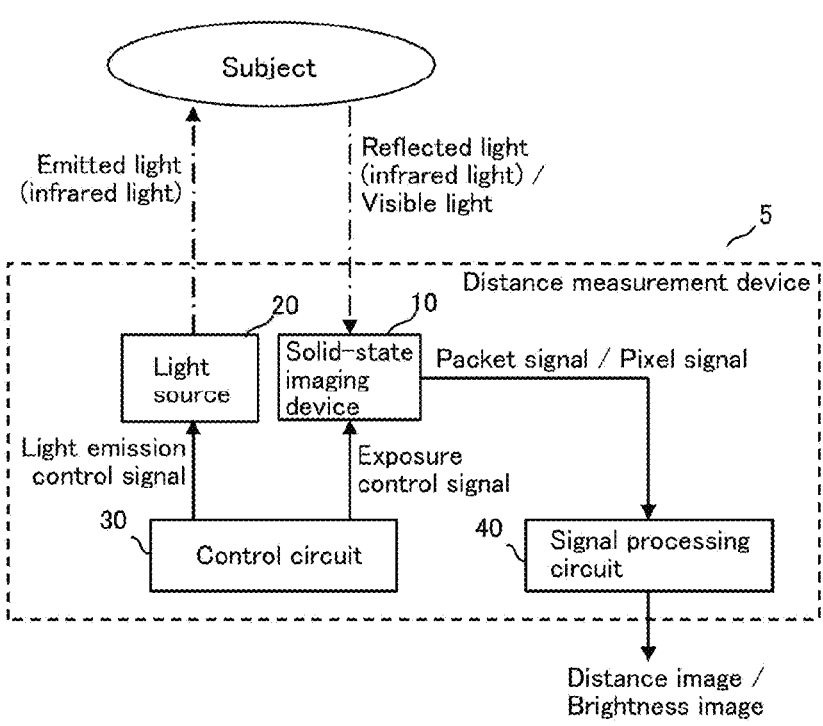
FIG. 1 is a block diagram illustrating an example of a configuration of a distance measurement device according to Embodiment 1.

[1.1 Configuration]
FIG. 1 is a block diagram illustrating an example of a configuration of distance measurement device 5 according to Embodiment 1.

Distance measurement device 5 is a distance measurement camera that generates distance images and visible light images. Accordingly, distance measurement device 5 includes light source 20, solid-state imaging device 10, control circuit 30, and signal processing circuit 40.

Light source 20 emits infrared pulsed light toward a subject in accordance with an emission control signal from control circuit 30. Light source 20 includes a light-emitting element such as a laser diode or a light emitting diode, for example.

Solid-state imaging device 10 is an image sensor that performs an exposure operation in accordance with an exposure control signal from control circuit 30 and generates a pixel signal through the exposure operation.

Figure 2:
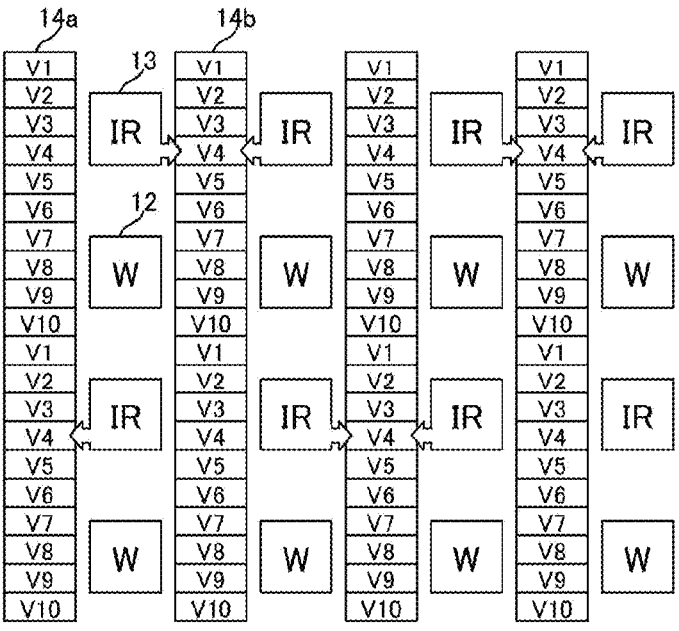
FIG. 2 is a block diagram illustrating an example of a configuration of a solid-state imaging device according to Embodiment 1.

FIG. 2 illustrates an example of a configuration of solid-state imaging device 10. As illustrated in the drawing, solid-state imaging device 10 includes a plurality of pixels and a plurality of vertical transfer portions (transferrers).

The pixels are disposed in a matrix. The pixels photo-electrically convert infrared light or visible light to generate signal charges. The pixels in FIG. 2 include first pixel rows and second pixel rows alternately disposed. The first pixel rows each include plural infrared-light pixels 13 one-dimensionally disposed. The second pixel rows each include plural visible-light pixels 12 one-dimensionally disposed. The pixels include first pixels that are readout targets for distance images and second pixels that are not readout targets for distance images. Infrared-light pixels 13 are specific examples of the first pixels, whereas visible-light pixels 12 are specific examples of the second pixels. The first pixels correspond to pixels for a distance image, and are read out in an operation of generating the distance image. The second pixels are not read out in the operation of generating a distance image, but are read out in an operation of generating a brightness image.

The vertical transfer portions include vertical transfer portions 14a in odd-numbered columns and vertical transfer portions 14b in even-numbered columns. In the following, when vertical transfer portions 14a and vertical transfer portions 14b are not distinguished in particular, vertical transfer portions 14a and vertical transfer portions 14b are referred to as vertical transfer portions 14. At vertical transfer portions 14, packets that hold and transfer signal charges are created. Here, packets are potential wells created by vertical transfer electrodes V1 to V10, and are used to hold and vertically transfer signal charges. To vertically transfer means to transfer packets in a longitudinal direction of vertical transfer portions 14, and the packets can be transferred in both directions. Accordingly, each of vertical transfer portions 14 includes vertical transfer electrodes V1 to V10 of several types that cover vertical transfer portion 14 and create packets.

Vertical transfer electrodes V1 to V10 of several types create and transfer packets according to a combination of voltages applied. In FIG. 2, vertical transfer electrodes V4 also serve as readout electrodes for reading out signal charges from infrared-light pixels 13 to vertical transfer portions 14. Two or more of vertical transfer electrodes V4 that also serve as readout electrodes are disposed to each read out signal charges from two infrared-light pixels 13 in, for example, an odd-numbered first pixel row out of the first pixel rows to vertical transfer portion 14b in an even-numbered column, and add and mix the signal charges. Remaining ones of vertical transfer electrodes V4 that also serve as readout electrodes are disposed to each read out signal charges from two infrared-light pixels 13 in, for example, an even-numbered first pixel row out of the first pixel rows to vertical transfer portion 14a in an odd-numbered column, and add and mix the signal charges.

Note that vertical transfer electrodes V9 out of vertical transfer electrodes V1 to V10 also serve as readout electrodes for reading out signal charges from visible-light pixels 12 to vertical transfer portions 14.

Control circuit 30 in FIG. 1 outputs, to light source 20, a light emission control signal having a light emission pulse that gives an instruction to emit pulsed light, and outputs, to solid-state imaging device 10, an exposure control signal having an exposure pulse that gives an instruction to be exposed to light. More specifically, control circuit 30 controls, for the first pixels (that is, infrared-light pixels 13), exposure operations of n types (n is an integer of at least 4) performed at different timings relative to pulsed light, with use of the light emission control signal and the exposure control signal. At this time, control circuit 30 reads out a signal charge generated in each of the exposure operations of the n types to a packet at a vertical transfer portion, and transfers the packet in the vertical direction. Within a region in which vertical transfer portions 14 are disposed, a first region in which n packets are created is adjacent to a pixel region in which m pixels (m is an integer of at least 3) are consecutively disposed in the vertical direction. The m pixels include the first pixels and the second pixels. Note that control circuit 30 may be configured of a dedicated logical circuit or may be configured to include a memory that stores therein a program, a processor that executes the program, and an input-output port, for instance.

Figure 3:
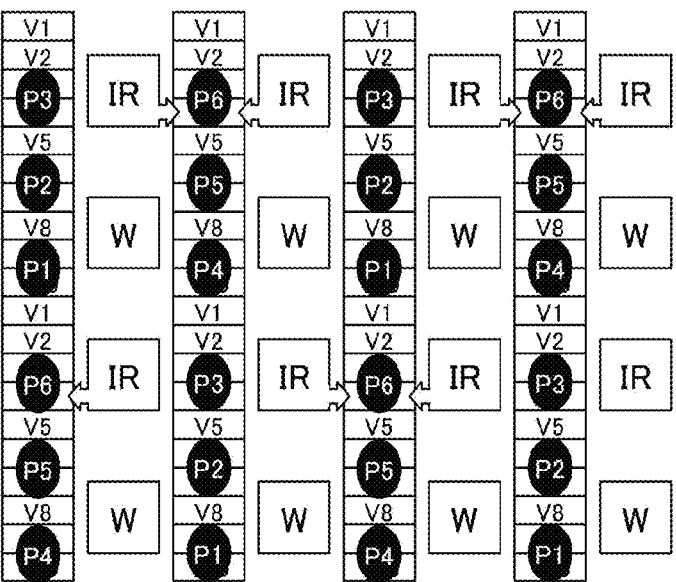
FIG. 3 is an explanatory drawing illustrating an example of arrangement of packets of six types created in a distance measurement operation according to Embodiment 1.

FIG. 3 illustrates an example of arrangement of packets when n=6. Signal charges read out from two infrared-light pixels 13 on the two sides of vertical transfer portion 14 are read out to n packets in correspondence with the exposure operations of the n types and held. Packets P1 to P6 in FIG. 3 are generated by executing exposure, reading out, and vertical transfer six times.

Signal processing circuit 40 in FIG. 1 calculates, for each first pixel (for each pair of infrared-light pixels 13, signal charges from which are mixed and added, in FIG. 3), a distance value, based on n packet signals output from solid-state imaging device 10. Specifically, signal processing circuit 40 first distinguishes a first packet signal corresponding to a first portion of reflected light that includes a leading end thereof and a second packet corresponding to a portion of the reflected light other than the first portion, from among the n packet signals. Next, signal processing circuit 40 selects a first background light packet signal and a second background light packet signal each indicating a background light component from among the n packet signals. The first background light packet signal can be considered to include signal charge BG0 of background light equivalent to that of the first packet signal. The second background light packet signal can be considered to include signal charge BG1 of background light equivalent to that of the second packet signal. Furthermore, signal processing circuit 40 subtracts the first background light packet signal from the first packet signal, subtracts the second background light packet signal from the second packet signal, and calculates a distance value from the resultant first packet and the resultant second packet each resulting from subtracting the background light signal from the packet signal. Note that signal processing circuit 40 may be configured to include a memory that stores therein data such as packet signals and programs, a processor that executes the programs, and an input-output port, for instance.

Note that distance measurement device 5 may include an optical system such as an optical lens, a driving mechanism that moves the optical lens, a display that displays visible light images and distance images that are generated, an auxiliary memory for storage, and an input device (a bottom or a touch panel) that receives instructions from an operator, for instance.

[1.2 Operation]

Operation of distance measurement device 5 according to the present embodiment having the configuration as above is to be described in the following.

First, exposure operations of n types and an operation of generating n packets are to be described.

Figure 4A:
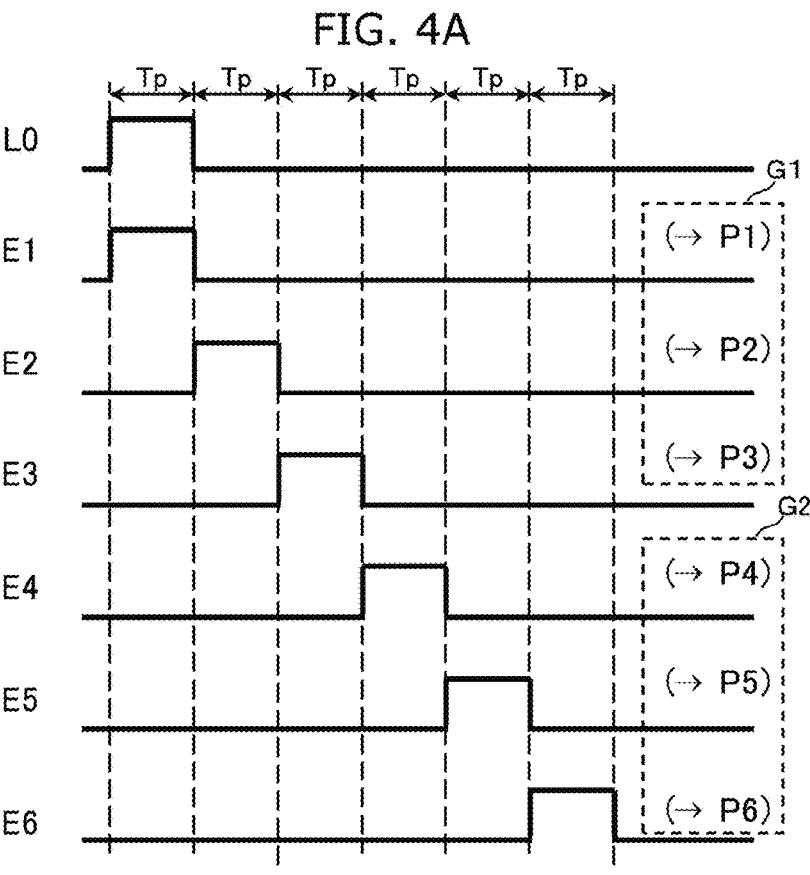
FIG. 4A is a time chart illustrating an example of operation of distance measurement device 5 according to Embodiment 1.

FIG. 4A is a time chart illustrating an example of operation of distance measurement device 5 according to Embodiment 1. In the drawing, "L0" indicates a light emission pulse that designates a light emission timing, which is included in a light emission control signal output from control circuit 30 to light source 20. Such light emission pulse L0 is a positive logic pulse, and gives an instruction to emit light at a high level and an instruction not to emit light at a low level. Pulse duration Tp of light emission pulse L0 is 10 ns, for example.

"E1" shows a first exposure pulse indicating an exposure timing, which is included in the exposure control signal output from control circuit 30 to solid-state imaging device 10. Such first exposure pulse E1 is a positive logic pulse, and gives an instruction to be exposed to light at a high level and an instruction not to be exposed to light at a low level. The pulse duration of the first exposure pulse is pulse duration Tp that is the same as the duration of the light emission pulse. Note that the pulse duration of the first exposure pulse may be different from that of the light emission pulse.

The same as first exposure pulse E1 applies to second exposure pulse E2 to sixth exposure pulse E6. Note that "E1" to "E6" give instructs to be exposed to light at different timings relative to light emission pulse L0.

FIG. 4A collectively illustrates exposure operations at six different timings on one time chart for convenience. The six types of exposure operations include an exposure operation caused by combination (L0, E1) of light emission pulse L0 and first exposure pulse E1 and exposure operations caused by (L0, E2), (L0, E3), (L0, E4), (L0, E5), and (L0, E6).

Control circuit 30 controls light source 20 and solid-state imaging device 10 to perform the exposure operations in this order. As a result, as illustrated in FIG. 3, a signal charge generated by the exposure operation caused by (L0, E1) is transferred to packet P1. Similarly, signal charges generated by the exposure operations caused by (L0, E2), (L0, E3), (L0, E4), (L0, E5), and (L0, E6) are transferred to packets P2 to P6.

A packet group of packets P1 to P3 in FIG. 4A is referred to as a first group. A packet group of packets P4 to P6 is referred to as a second group. The first group and the second group have the following difference with regard to dark currents. Hence, the first group includes packets that have passed through first predetermined readout electrodes at vertical transfer portion 14, out of n packets. The second group includes packets that have passed through second predetermined readout electrodes. The first predetermined readout electrodes refer to readout electrodes that do not read out signal charges to such packets P1 to P3 out of vertical transfer electrodes V4 that also serve as readout electrodes in FIG. 2, whereas the second predetermined readout electrodes refer to readout electrodes that do not read out signal charges to such packets P4 to P6 out of vertical transfer electrodes V4 that also serve as readout electrodes in FIG. 2. A high voltage for reading out is applied also to the first and second predetermined readout electrodes, and thus the packets that have passed through the first and second predetermined readout electrodes include different dark current components from one another. Thus, the packets in the first group include dark current components different from those in the packets in the second group. The packets in the same group are considered to include substantially the same amount of dark current components.

Figure 4B:
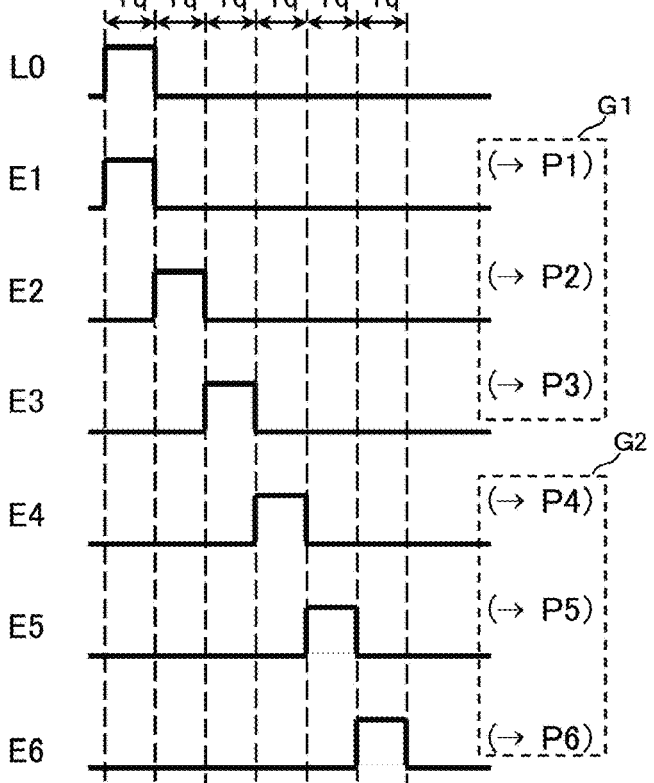
FIG. 4B is a time chart illustrating another example of operation of distance measurement device 5 according to Embodiment 1.

Here, examples of operations in FIG. 4A are to be described using the case where n=3 and m=2 as a comparative example. This comparative example corresponds to operations excluding fourth to sixth exposure pulses E4 to E6 from FIG. 4A so that packets P4 to P6 are not created. For example, if the exposure pulse duration is the same as that in the comparative example, the distance measurement range can be increased 2.5 times in the examples of operations in FIG. 4A. As illustrated in FIG. 4B, if exposure pulse duration Tq is approximately a half of pulse duration Tp in the comparative example, distance measurement variations can be reduced by approximately a half with the same distance measurement range.

Next, operations of the distance measurement device from light exposure to generation of distance images are to be described.

Figure 5:
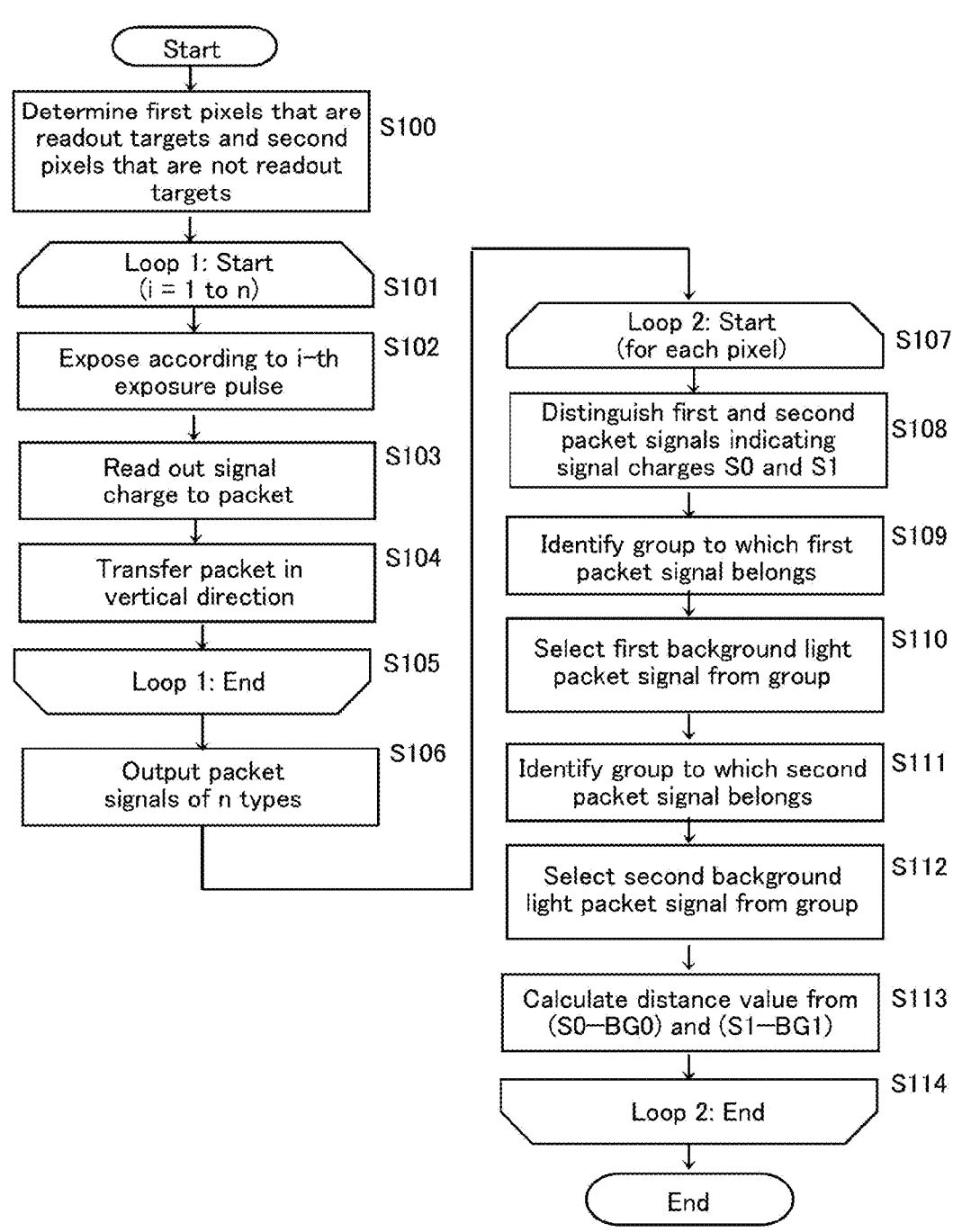
FIG. 5 is a flowchart illustrating an example of operation of the distance measurement device according to Embodiment 1.

FIG. 5 is a flowchart illustrating an example of operation of the distance measurement device according to Embodiment 1. When a distance image is to be generated, first, distance measurement device determines pixels for a distance image as first pixels that are readout targets, and determines pixels not for a distance image as second pixels that are not readout targets (S100). In the example in FIG. 2, the first pixels are infrared-light pixels 13. The second pixels are visible-light pixels 12.

Next, distance measurement device 5 generates packet 1 to packet n for each pixel by performing processing n times in loop 1 (S101 to S106). A pixel here is a pixel for a distance image, and in the example in FIG. 3, two infrared-light pixels 13, signal charges from which are mixed and added, correspond to one pixel for the distance image. Control variable i in FIG. 5 is an integer from 1 through n. n is an integer of at least 4, and is 6 in the example in FIG. 3.

In loop 1, distance measurement device 5 performs exposure to pulsed light according to an i-th exposure pulse (S102), and reads out a signal charge generated in visible-light pixel 12 by the exposure to vertical transfer portion 14 (S103). Accordingly, packet i is created at vertical transfer portion 14 according to the i-th exposure pulse. Furthermore, distance measurement device 5 transfers each packet at vertical transfer portion 14 by one packet in the vertical direction (S104).

Packets P1 to Pn of n types are generated for each pixel for a distance image by the processing in loop 1.

Solid-state imaging device 10 outputs packet signals of n types that indicate signal charge amounts of packets P1 to Pn to signal processing circuit 40 (S106). A packet signal may be a digital signal or an analog signal.

Signal processing circuit 40 calculates distance values, based on packet signals of n types output from solid-state imaging device 10, in loop 2 (S107 to S114). Loop 2 is processing repeatedly performed for each pixel for the distance image.

In loop 2, signal processing circuit 40 distinguishes, from among the n packet signals, the first packet signal indicating signal charge S0 and corresponding to a portion of reflected light that includes a leading end thereof, and the second packet signal indicating signal charge S1 and corresponding to a portion of the reflected light other than the portion that includes the leading end (S108).

Here, signal charge S0 and signal charge S1 are to be described with reference to FIG. 6A to FIG. 6C. RA, RB, and RC in FIG. 6A to FIG. 6C show examples of timings of reflected light that is reflected off an object.

Figure 6A:
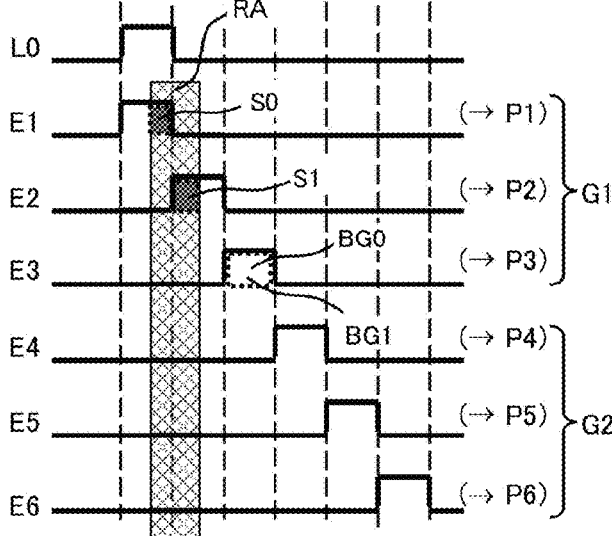
FIG. 6A is an explanatory drawing illustrating first examples of timings of reflected light according to Embodiment 1.

In the example in FIG. 6A, exposure to a portion that includes the leading end of reflected light RA is performed at first exposure pulse E1, and generates signal charge S0.

Signal charge S0 is held in packet P1. Exposure to a portion of reflected light RA other than the portion that includes the leading end is performed at second exposure pulse E2, and generates signal charge S1. Signal charge S1 is held in packet P2. All the signal charges generated by reflected light RA correspond to S0+S1.

Figure 6B:
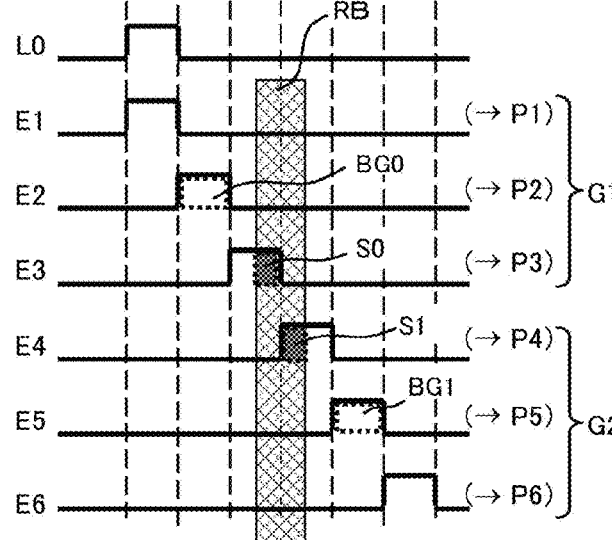
FIG. 6B is an explanatory drawing illustrating second examples of timings of reflected light according to Embodiment 1.
Figure 6C:
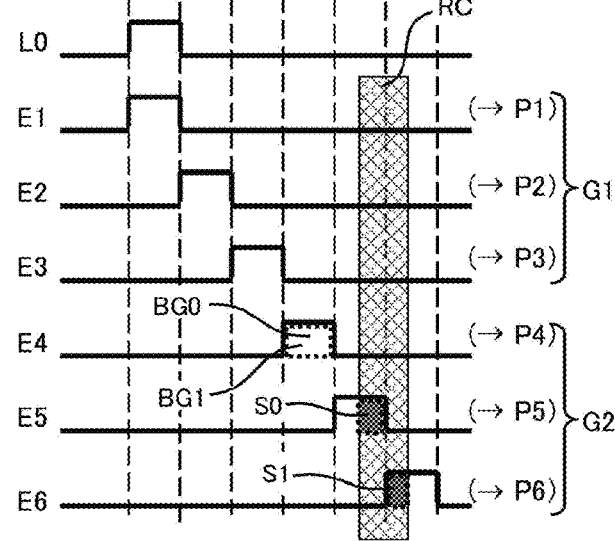
FIG. 6C is an explanatory drawing illustrating third examples of timings of reflected light according to Embodiment 1.

In the example in FIG. 6B, exposure to a portion of reflected light RB that includes the leading end thereof is performed at third exposure pulse E3, and generates signal charge S0. Signal charge S0 is held in packet P3. Exposure to a portion of reflected light RB other than the portion that includes the leading end is performed at fourth exposure pulse E4, and generates signal charge S1. Signal charge S1 is held in packet P4. All the signal charges generated by reflected light RB correspond to S0+S1.

In the example in FIG. 6C, exposure to a portion of reflected light RC that includes the leading end thereof is performed at fifth exposure pulse E5, and generates signal charge S0. Signal charge S0 is held in packet P5. Exposure to a portion of reflected light RC other than the portion that includes the leading end is performed at sixth exposure pulse E6, and generates signal charge S1. Signal charge S1 is held in packet P6. All the signal charges generated by reflected light RB correspond to S0+S1.

Out of packet signals of n types, a packet signal corresponding to a packet that holds signal charge S0 is referred to as a first packet signal. Out of the packet signals of the n types, a packet signal corresponding to a packet that holds signal charge S1 is referred to as a second packet signal.

Next, signal processing circuit 40 identifies a group to which the distinguished first packet signal belongs (S109), and selects a first background light packet signal from the identified group (S110). The first background light packet signal does not include a signal charge generated by reflected light out of the n packet signals, and refers to a packet signal that includes a signal charge generated by background light. In FIG. 6A, packets P3 to P6 do not include signal charges generated by reflected light and include signal charges generated by background light. In FIG. 6A, the first packet signal corresponds to packet P1 and is included in first group G1, and thus a packet signal corresponding to packet P3 is selected as the first background light packet signal. In FIG. 6B, a packet signal corresponding to packet P2 is selected as the first background light packet signal. Note that in FIG. 6B, a packet signal corresponding to packet P1 may be selected as the first background light packet signal. In FIG. 6C, a packet signal corresponding to packet P4 is selected as the first background light packet signal.

Furthermore, signal processing circuit 40 identifies a group to which the distinguished second packet signal belongs (S111), and selects a second background light packet signal from the identified group (S112). The second background light packet signal does not include a signal charge generated by reflected light out of the n packet signals, and refers to a packet signal that includes a signal charge generated by background light. In FIG. 6A, packets P3 to P6 do not include reflected light, but include background light. In FIG. 6A, the second packet signal corresponds to packet P2 and is included in first group G1, and thus a packet signal corresponding to packet P3 is selected as the second background light packet signal. In FIG. 6B, a packet signal corresponding to packet P5 is selected as the second background light packet signal. Note that in FIG. 6B, a packet signal corresponding to packet P6 may be selected as the second background light packet signal. In FIG. 6C, a packet signal corresponding to packet P4 is selected as the second background light packet signal.

Furthermore, signal processing circuit 40 subtracts the first background light packet signal from the first packet signal indicating signal charge S0, subtracts the second background light packet signal from the second packet signal indicating signal charge S1, and calculates a distance value from the resultant first packet signal and the resultant second packet signal from which the background light signals have been subtracted (S113).

Distance value z is calculated by Expression 1, for example.

$$z = \{c \times (i-1) \times Tp + c \times ((S1-BG1)/(S0-BG0+S1-BG1)) \times Tp\}/2 \qquad \text{(Expression 1)}$$

The first packet signal and the first background light packet signal belong to the same group, and thus include approximately the same amount of dark current components. Thus, by subtracting the first background light packet signal from the first packet signal, not only the background light components can be cancelled out, but also the dark current components can be cancelled out.

Similarly, the second packet signal and the second background light packet signal belong to the same group, and thus include approximately the same amount of dark current components. Thus, by subtracting the second background light packet signal from the second packet signal, not only the background light components can be cancelled out, but also the dark current components can be cancelled out.

In this manner, according to an example of the operation illustrated in FIG. 5, candidates to be selected for the first background light packet signal and the second background light packet signal are each limited within a group, and thus a dark current component having a magnitude that differs depending on a group can be appropriately cancelled out when calculating a distance value.

As described above, a distance measurement device according to Embodiment 1 includes: light source 20 that emits pulsed light; solid-state imaging device 10; and control circuit 30. Solid-state imaging device 10 includes: pixels that generate signal charges through photoelectric conversion; vertical transfer portions 14 at which packets that hold and transfer the signal charges are created; and vertical transfer electrodes V1 to V10 of plural types that cover vertical transfer portions 14 and create the packets. The pixels include first pixels (for example, infrared-light pixels 13) that are readout targets and included in a predetermined frame, and second pixels (for example, visible-light pixels 12) that are not readout targets and not included in the predetermined frame. Control circuit controls, for the first pixels, exposure operations of n types performed at different timings relative to the pulsed light, and reads out signal charges of n types to n packets at each of vertical transfer portions 14 out of the packets where n is an integer of at least 4, the signal charges of the n types being generated through the exposure operations of the n types. Within a region in which vertical transfer portions 14 are disposed, a first region in which the n packets are created is adjacent to a pixel region in which m pixels are consecutively disposed in a vertical direction where m is an integer of at least 3, and the m pixels include at least one of the first pixels and at least one of the second pixels.

According to this, a distance measurement range can be increased and distance measurement variations can be decreased. Specifically, exposure to reflected light is performed in at least four exposure operations at different timings, and thus a distance measurement range can be increased. Variations in distance measurement can be decreased by shortening exposure pulse durations in the at least four exposure operations.

Here, n may be at least 6, and m may be at least 4.

According to this, for example, in comparison to the case where n=3 and m=2 as a comparative example, if the exposure pulse duration is the same, the distance measurement range can be increased at least 2.5 times, and if the exposure pulse duration is reduced by a half, the distance measurement variations can be reduced by a half or less.

Here, control circuit 30 may generate a first exposure pulse to an n-th exposure pulse that are each combined with the pulsed light. Time differences between the pulsed light and the first exposure pulse to the n-th exposure pulse may increase in order from the first exposure pulse to the n-th exposure pulse, and in the exposure operations of the n types, the control circuit may generate the first exposure pulse to the n-th exposure pulse in the order from the first exposure pulse to the n-th exposure pulse.

According to this, the order in which n packets are arranged at a vertical transfer portion is the same as the descending or ascending order of time differences from the pulsed light. Stated differently, the n packets are arranged in the order of adjacent distance ranges. Thus, signal charges generated by reflected light can be held in two packets adjacent to each other in the arrangement of the n packets.

Here, distance measurement device 5 may further include: signal processing circuit 40 that calculates a distance value, based on n packet signals corresponding to the n packets output by solid-state imaging device 10. Signal processing circuit 40 may distinguish a first packet signal and a second packet signal from among the n packet signals, the first packet signal corresponding to a portion of reflected light that includes a leading end of the reflected light, the second packet corresponding to a portion of the reflected light other than the portion that includes the leading end; select, from among the n packet signals, a first background light packet signal and a second background light packet signal each indicating a background light component; subtract the first background light packet signal from the first packet signal; subtract the second background light packet signal from the second packet signal; and calculate the distance value from a resultant first packet signal and a resultant second packet signal, the resultant first packet signal resulting from subtracting the first background light packet signal from the first packet signal, the resultant second packet signal resulting from subtracting the second background light packet signal from the second packet signal.

According to this, influence of background light and dark currents on distance values can be reduced.

Here, the n packet signals may be grouped into a first group and a second group where n is an even number, the first group including a packet signal corresponding to a packet that has passed through a predetermined readout electrode out of the n packets, the second group including a packet signal corresponding to a packet that has not passed through the predetermined readout electrode out of the n packets, and signal processing circuit 40: may select the first background light packet signal from a group to which the first packet signal belongs, out of the first group and the second group; and may select the second background light packet signal from a group to which the second packet signal belongs, out of the first group and the second group.

According to this, influence of background light on distance values can be reduced, and influence of dark currents on distance values can be further effectively reduced. This is because the first packet signal and the first background light packet belong to the same group, and thus include an approximately same amount of dark current components. Furthermore, the second packet signal and the second background light packet belong to the same group, and thus include an approximately same amount of dark current components.

Here, the first pixels may be infrared-light pixels that photoelectrically convert infrared light, and the second pixels (visible-light pixels 12) may be visible-light pixels that photoelectrically convert visible light.

According to this, brightness images can be generated using visible light, in addition to distance images.

Here, the pixels may be included in first pixel rows and second pixel rows that are alternately disposed, the first pixel rows may each include at least two infrared-light pixels 13 that are one-dimensionally disposed, out of infrared-light pixels 13, and the second pixel rows may each include at least two visible-light pixels 12 that are one-dimensionally disposed, out of visible-light pixels 12.

According to this, a distance measurement range can be increased and distance measurement variations can be decreased.

Here, out of vertical transfer portions 14, vertical transfer portions 14 in predetermined columns may each mix signal charges from two infrared-light pixels that are adjacent to each other in a row direction and included in a predetermined row out of the first pixel rows, in a readout operation on the first pixels, and vertical transfer portions 14 in columns other than the predetermined columns may each mix signal charges from two infrared-light pixels that are adjacent to each other in the row direction and included in a row other than the predetermined row out of the first pixel rows, in the readout operation on the first pixels. The predetermined columns may be odd-numbered columns or even-numbered columns, and the predetermined row may be an odd-numbered first pixel row or an even-numbered first pixel row in a group of the first pixel rows.

According to this, sensitivity can be improved along with mixture of signal charges from pixels.

A distance measurement method according to Embodiment 1 is a distance measurement method for use in a distance measurement device that includes light source 20 that emits pulsed light and solid-state imaging device 10, the distance measurement method including: determining first pixels that are readout targets and second pixels that are not readout targets; controlling, for the first pixels, exposure operations of n types performed at different timings relative to the pulsed light where n is an integer of at least 4; and reading out signal charges of n types to n packets at vertical transfer portion 14 in the solid-state imaging device, the signal charges of the n types being generated through the exposure operations of the n types. Within a region in which vertical transfer portion 14 is disposed, a first region in which the n packets are created is adjacent to a pixel region in which m pixels are consecutively disposed in a vertical direction where m is an integer of at least 3, and the m pixels include at least one of the first pixels and at least one of the second pixels.

According to this, a distance measurement range can be increased, and distance measurement variations can be decreased. Specifically, exposure to reflected light is performed in at least four exposure operations at different timings, and thus distance calculation for three or more distance ranges can be performed or whether an object is present in four or more distance ranges can be determined, so that a distance measurement range can be increased.

Variations in distance measurement can be decreased by shortening exposure pulse durations in the at least four exposure operations.

Here, the distance measurement method may further include: distinguishing a first packet signal and a second packet signal from among the n packet signals, the first packet signal corresponding to a portion of reflected light that includes a leading end of the reflected light, the second packet corresponding to a portion of the reflected light other than the portion that includes the leading end; selecting, from among the n packet signals, a first background light packet signal and a second background light packet signal each indicating a background light component; subtracting the first background light packet signal from the first packet signal; subtracting the second background light packet signal from the second packet signal; and calculating the distance value from a resultant first packet signal and a resultant second packet signal, the resultant first packet signal resulting from subtracting the first background light packet signal from the first packet signal, the resultant second packet signal resulting from subtracting the second background light packet signal from the second packet signal.

According to this, influence of background light and dark currents on distance values can be reduced.

Embodiment 2

In Embodiment 1, (S0+S1) that are all the signal charges generated by reflected light are held in two adjacent packets in the arrangement of the n packets at vertical transfer portion 14. In contrast, Embodiment 2 is to describe an example of a configuration in which (S0+S1) that are all the signal charges generated by reflected light are held in two packets not adjacent to each other in the arrangement of the n packets at vertical transfer portion 14.

A configuration of distance measurement device 5 in the present embodiment may be the same as those in FIG. 1 to FIG. 3. Note that the main difference is the order of exposure operations of n types performed by control circuit 30. The following gives a description focusing on different points while avoiding redundant description of the same points.

Figure 7A:
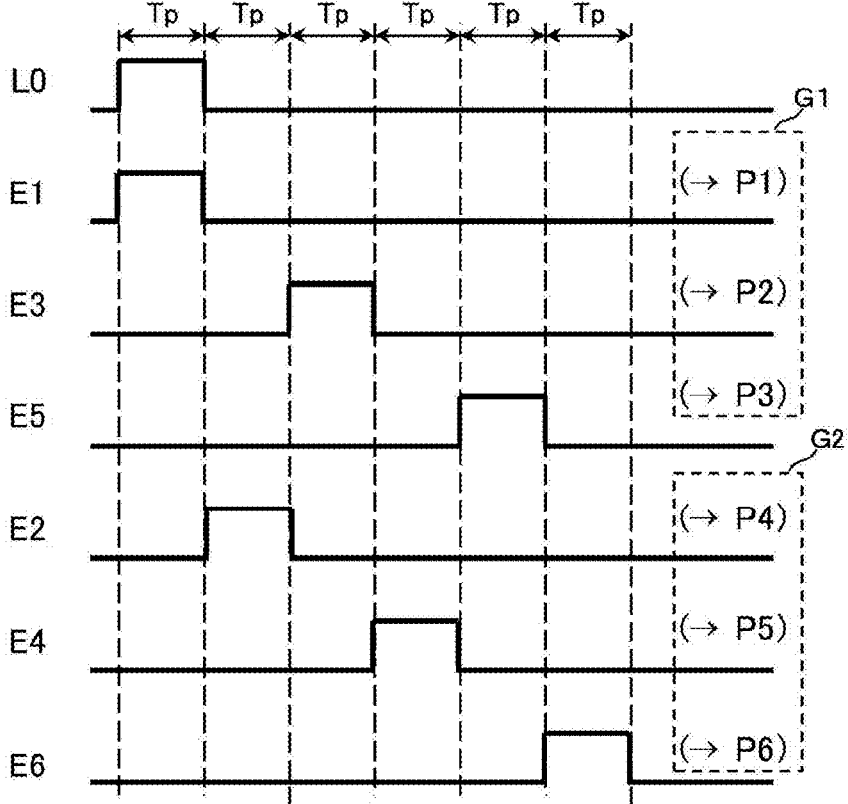
FIG. 7A is a time chart illustrating an example of operation of distance measurement device 5 according to Embodiment 2.
Figure 7B:
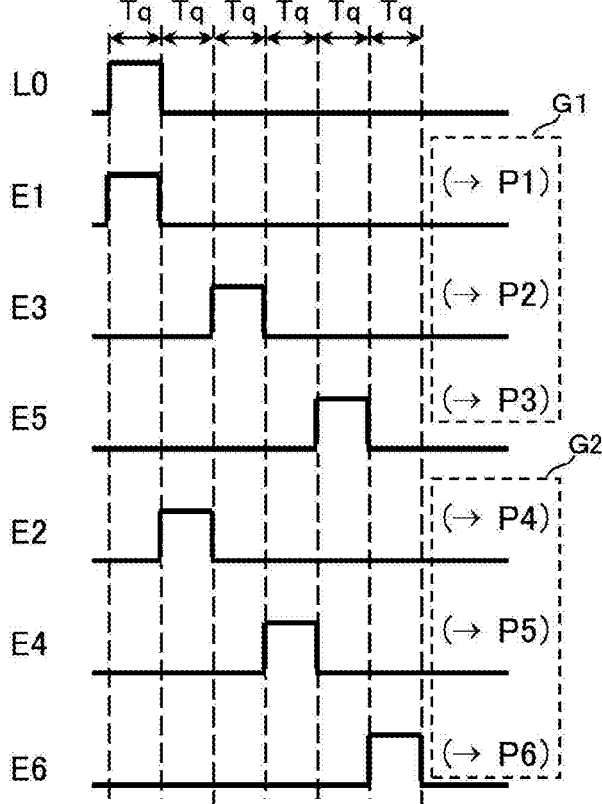
FIG. 7B is a time chart illustrating another example of operation of distance measurement device 5 according to Embodiment 2.

FIG. 7A is a time chart illustrating an example of operation of distance measurement device 5 according to Embodiment 2. The order in which first exposure pulse E1 to sixth exposure pulse E6 are output in the drawing is different from that in FIG. 4A. In FIG. 7A, the exposure operations of the six types are executed in the order of (L0, E1), (L0, E3), (L0, E5), (L0, E2), (L0, E4), and (L0, E6). As a result, exposure operations of (L0, E1), (L0, E3), and (L0, E5) are executed in this order, and packets P1, P2, and P3 in a first group are generated. The exposure operations of (L0, E2), (L0, E4), and (L0, E6) are executed in this order, and packets P4, P5, and P6 in a second group are generated. FIG. 7B is similar to FIG. 7A except that the pulse duration is different.

Figure 8:
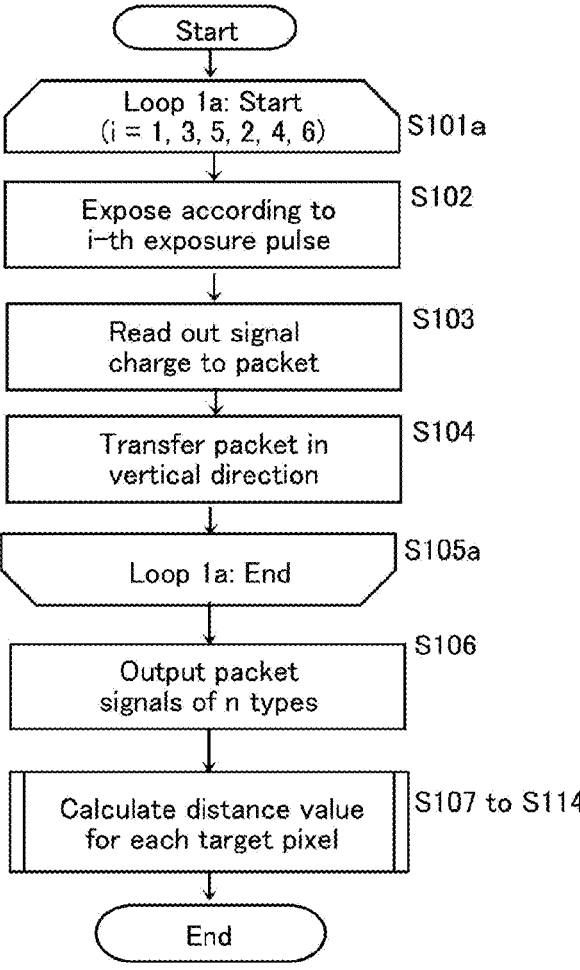
FIG. 8 is a flowchart illustrating an example of operation of the distance measurement device according to Embodiment 2.

FIG. 8 is a flowchart illustrating an example of operation of the distance measurement device according to Embodiment 2. The drawing is different from FIG. 5 in that loop 1a is executed instead of loop 1.

Loop 1a (S101a to S105a) are different from loop 1 (S101 to S105) in FIG. 5 in that control variable i takes the value in the order of 1, 3, 5, 2, 4, and 6. Control variable i corresponds to an i-th exposure pulse.

Next, a first packet signal, a second packet signal, a first background light packet signal, and a second background light packet signal in Embodiment 2 are to be described with reference to FIG. 9A to FIG. 9C. RA, RB, and RC in FIG.

Figure 9A:
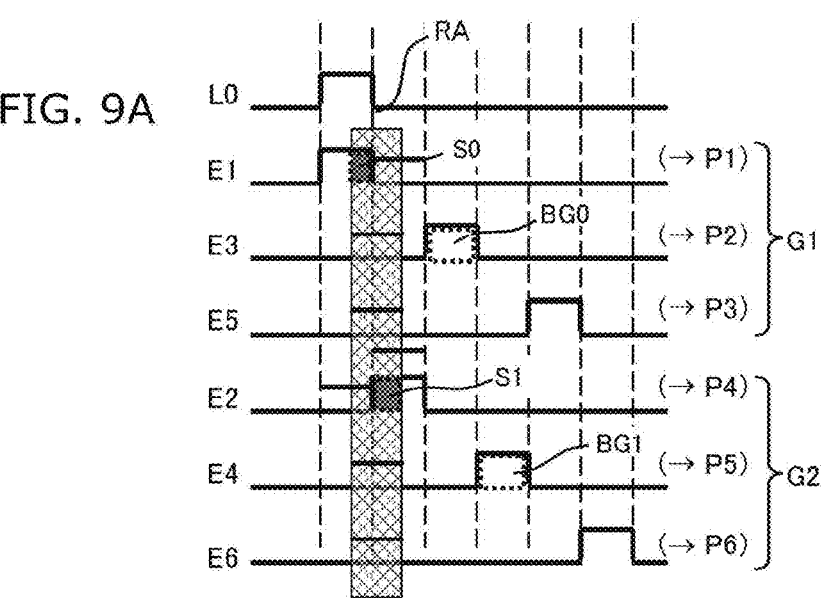
FIG. 9A is an explanatory drawing illustrating first examples of timings of reflected light according to Embodiment 2.
Figure 9B:
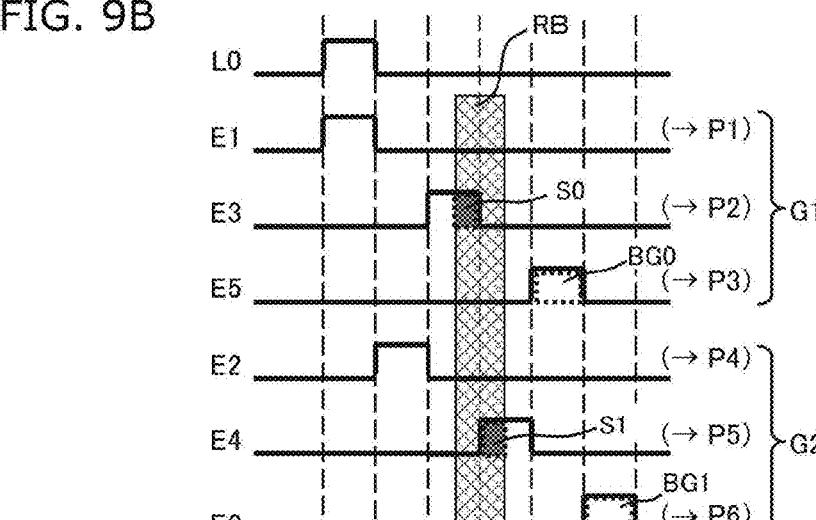
FIG. 9B is an explanatory drawing illustrating second examples of timings of reflected light according to Embodiment 2.
Figure 9C:
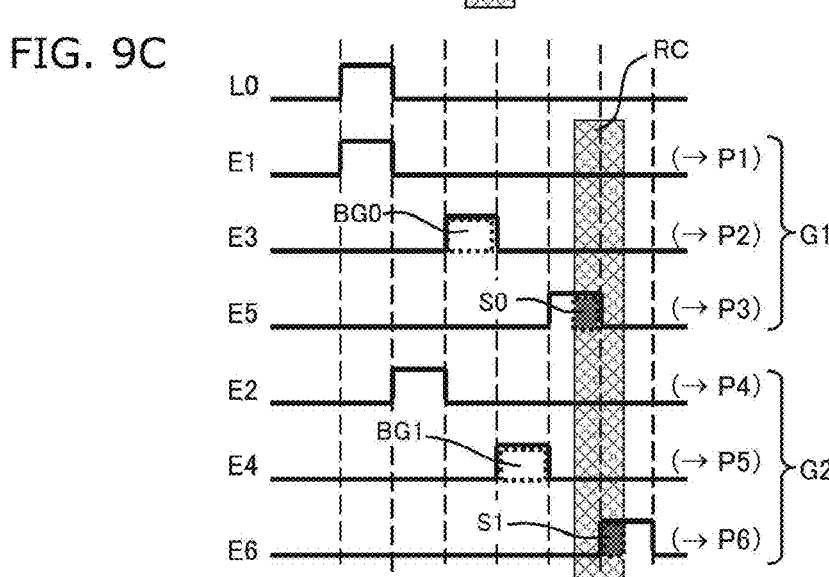
FIG. 9C is an explanatory drawing illustrating third examples of timings of reflected light according to Embodiment 2.

9A to FIG. 9C show examples of timings of reflected light that is reflected off an object, similarly to FIG. 6A to FIG. 6C.

In the example in FIG. 9A, exposure to a portion of reflected light RA that includes the leading end thereof is performed at first exposure pulse E1, and generates signal charge S0. Signal charge S0 is held in packet P1. Exposure to a portion of reflected light RA other than the portion that includes the leading end is performed at second exposure pulse E2, and generates signal charge S1. Signal charge S1 is held in packet P4.

(S0+S1) that are all the signal charges generated by reflected light RA are held in packet P1 and packet P4, respectively. The first packet signal corresponds to packet P1. The second packet signal corresponds to packet P4.

The first background light packet signal is selected from a group the same as the group that includes the first packet signal, and a packet signal corresponding to packet P2 is selected. Note that the first background light packet signal may be a packet signal corresponding to packet P3. The second background light packet signal is selected from a group the same as the group that includes the second packet signal, and a packet signal corresponding to packet P5 is selected. Note that the second background light packet signal may be a packet signal corresponding to packet P6.

In this manner, in FIG. 9A, (S0+S1) that are all the signal charges generated by reflected light are held in packets P1 and P4, respectively, which are not adjacent to each other in the arrangement of the n packets at vertical transfer portion 14. Accordingly, two candidates for the first background light packet signal can be included. Hence, the first background light packet signal can be more appropriately selected. Similarly, two candidates for the second background light packet signal can be included. In this regard, FIG. 6A shows one candidate for each of the first background light packet signal and the second background light packet signal. In FIG. 9A, the background light components and the dark current components can be cancelled out more appropriately than in FIG. 6A.

In the example in FIG. 9B, exposure to a portion of reflected light RB that includes the leading end thereof is performed at third exposure pulse E3, and generates signal charge S0. Signal charge S0 is held in packet P2. Exposure to a portion of reflected light RB other than the portion that includes the leading end is performed at fourth exposure pulse E4, and generates signal charge S1. Signal charge S1 is held in packet P5.

(S0+S1) that are all the signal charges generated by reflected light RB are held in packet P2 and packet P5, respectively. The first packet signal corresponds to packet P2. The second packet signal corresponds to packet P5.

The first background light packet signal is selected from a group the same as the group that includes the first packet signal, and a packet signal corresponding to packet P3 is selected. Note that the first background light packet signal may be a packet signal corresponding to packet P1. The second background light packet signal is selected from a group the same as the group that includes the second packet signal, and a packet signal corresponding to packet P6 is selected. Note that the second background light packet signal may be a packet signal corresponding to packet P4.

In this manner, in FIG. 9B, (S0+S1) that are all the signal charges generated by reflected light are held in packets P2 and P5, respectively, which are not adjacent to each other in the arrangement of the n packets at vertical transfer portion 14. Accordingly, two candidates for the first background light packet signal can be included. Hence, the first background light packet signal can be more appropriately selected. Similarly, two candidates for the second background light packet signal can be included. This point is the same as FIG. 6B.

In the example in FIG. 9C, exposure to a portion of reflected light RC that includes the leading end thereof is performed at fifth exposure pulse E5, and generates signal charge S0. Signal charge S0 is held in packet P3. Exposure to a portion of reflected light RC other than the portion that includes the leading end is performed at sixth exposure pulse E6, and generates signal charge S1. Signal charge S1 is held in packet P6.

(S0+S1) that are all the signal charges generated by reflected light RC are held in packet P3 and packet P6, respectively. The first packet signal corresponds to packet P3. The second packet signal corresponds to packet P6.

The first background light packet signal is selected from a group the same as the group that includes the first packet signal, and a packet signal corresponding to packet P2 is selected. Note that the first background light packet signal may be a packet signal corresponding to packet P1. The second background light packet signal is selected from a group the same as the group that includes the second packet signal, and a packet signal corresponding to packet P5 is selected. Note that the second background light packet signal may be a packet signal corresponding to packet P4.

In this manner, in FIG. 9C, (S0+S1) that are all the signal charges generated by reflected light are held in packets P3 and P6, respectively, which are not adjacent to each other in the arrangement of the n packets at vertical transfer portion 14. Accordingly, two candidates for the first background light packet signal can be included. Hence, the first background light packet signal can be more appropriately selected. Similarly, two candidates for the second background light packet signal can be included. Hence, the second background light packet signal can be more appropriately selected. Similarly, two candidates for the second background light packet signal can be included. In this regard, FIG. 6C shows only one candidate for each of the first background light packet signal and the second background light packet signal. In FIG. 9C, the background light components and the dark current components can be cancelled out more appropriately than in FIG. 6C.

As described above, in the distance measurement device according to Embodiment 2, control circuit 30 generates a first exposure pulse to an n-th exposure pulse that are each combined with the pulsed light, time differences between the pulsed light and the first exposure pulse to the n-th exposure pulse increase in order from the first exposure pulse to the n-th exposure pulse, and in the exposure operations of the n types, control circuit 30 generates the first exposure pulse to the n-th exposure pulse, by sequentially generating odd-numbered exposure pulses and sequentially generating even-numbered exposure pulses.

According to this, the order in which n packets are arranged at a vertical transfer portion is not in the order of time differences from pulsed light, but in a discontinuous order. According to this, signal charges generated by reflected light can be held in two packets that are not adjacent to each other in the arrangement of the n packets. In this case, two packets corresponding to reflected light are not adjacent to each other, and thus more candidates for a packet having a background light component corresponding to those of the two packets can be included. As a result, distance measurement variations can be further reduced.

Embodiment 3

Embodiment 3 is to describe an example of a configuration of a distance measurement device that includes a pixel array different from that in FIG. 2.

[3.1 Configuration]

A configuration of distance measurement device 5 in the present embodiment may be the same as that in FIG. 1. Note that solid-state imaging device 10 has a different configuration of pixels. The following description focuses on different points.

Figure 10:
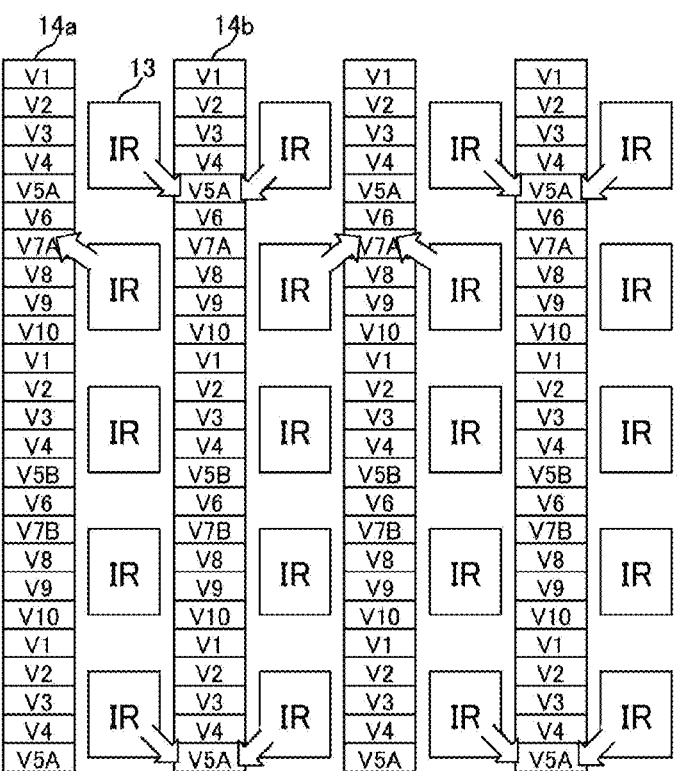
FIG. 10 is a block diagram illustrating an example of a configuration of a solid-state imaging device according to Embodiment 3.

FIG. 10 is a block diagram illustrating an example of a configuration of a solid-state imaging device according to Embodiment 3. The example in the drawing is different from that in FIG. 2 in that infrared-light pixels 13 are included instead of visible-light pixels 12. Such solid-state imaging device 10 generates distance images and brightness images. Brightness images are two-dimensional images generated using infrared light. Distance images are generated similarly to Embodiments 1 and 2.

Control circuit 30 uses two pixel rows out of four pixel rows adjacent in the column direction, and does not use the remaining two pixel rows, in generating distance images. Thus, first pixels that are readout targets for distance images belong to two pixel rows out of the four pixel rows adjacent in the column direction. Second pixels that are not readout targets belong to the remaining two pixel rows out of the four pixel rows adjacent in the column direction. Accordingly, in FIG. 10, out of vertical transfer electrodes V1 to V10 of plural types, V5A, V5B, V7A, and V7B also serve as readout electrodes. Vertical transfer electrodes V5A and V5B that also serve as readout electrodes can be independently controlled. Vertical transfer electrodes V7A and V7B that also serve as readout electrodes can also be independently controlled. In the operation of generating distance images, vertical transfer electrodes V5A and V7A are used as readout electrodes, and vertical transfer electrodes V5B and V7B are not used as readout electrodes. Accordingly, two pixel rows out of four pixel rows are used, and the remaining two pixel rows are not used.

Figure 11:
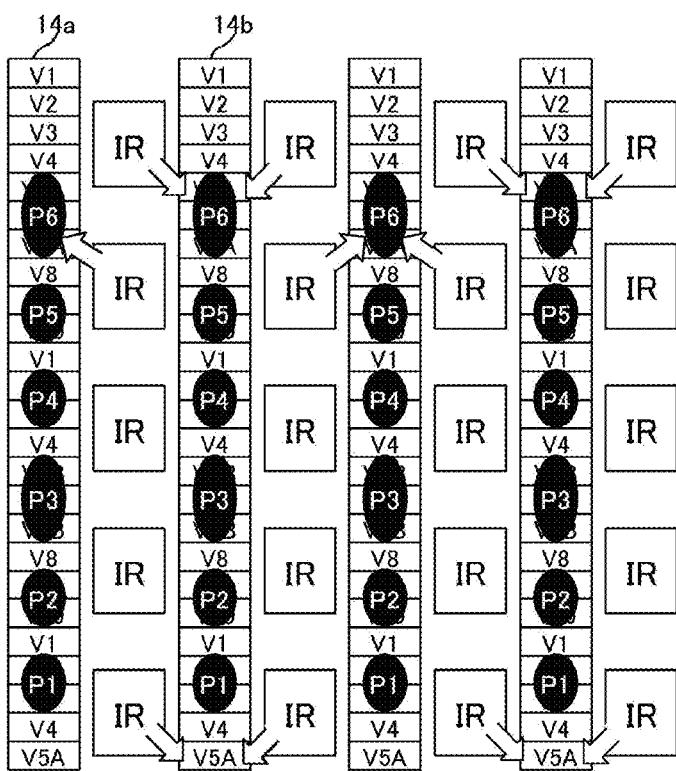
FIG. 11 is an explanatory drawing illustrating an example of arrangement of packets of six types created in a distance measurement operation according to Embodiment 3.

FIG. 11 illustrates an example of arrangement of packets when n=6 in FIG. 10. Signal charges read out from two infrared-light pixels 13 on the two side of vertical transfer portion 14 are read out to and held in 6 packets in correspondence with exposure operations of n types. Packets P1 to P6 are generated by executing exposure, reading out, and vertical transfer six times.

The distance measurement operation in the present embodiment may be performed following the flowchart in FIG. 5 according to Embodiment 1 or may be performed following the flowchart in FIG. 8 according to Embodiment 2.

As described above, in the distance measurement device according to Embodiment 3, the pixels are infrared-light pixels that photoelectrically convert infrared light.

According to this, a distance measurement range can be increased and distance measurement variations can be decreased.

Here, the first pixels may belong to two pixel rows out of four pixel rows adjacent to one another in a column direction, the second pixels may be pixels other than the first pixels that belong to the two pixel rows out of the four pixel rows, out of the vertical transfer portions, vertical transfer portions in predetermined columns may each mix signal charges from two first pixels that are adjacent to each other in a row direction and included in a first predetermined pixel row, in a readout operation on the first pixels, and vertical transfer portions in columns other than the predetermined columns may each mix signal charges from two first pixels that are adjacent to each other in the row direction and included in a second predetermined pixel row, in the readout operation on the first pixels, the predetermined columns may be odd-numbered columns or even-numbered columns, the first predetermined pixel row may be one of the two pixel rows, and the second predetermined pixel row may be a remaining one of the two pixel rows.

According to this, visible light images can be generated in addition to distance images.

Note that in the above embodiments, each of the elements may be configured of dedicated hardware, or may be implemented by executing a software program suitable for the element. Each element may be implemented by a program executor such as a central processing unit (CPU) or a processor reading and executing a software program recorded on a recording medium such as a hard disk or semiconductor memory. Here, the software used to implement distance measurement device 5 according to each of the above embodiments is a program as follows.

Specifically, this program causes a computer to execute the distance measurement method illustrated in FIG. 5 or FIG. 8.

The above has described the distance measurement devices according to one or more aspects of the present disclosure, based on the embodiments, yet the present disclosure is not limited to such embodiments. The scope of the one or more aspects of the present disclosure may include embodiments resulting from various modifications which may be conceived by those skilled in the art to the embodiments of the present application, or embodiments achieved by combining elements in different embodiments, as long as the resultant embodiments do not depart from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a distance measurement device that generates distance images.

The invention claimed is:

1. A distance measurement device comprising:
   a light source that emits pulsed light;
   a solid-state imaging device; and
   a control circuit,
   wherein the solid-state imaging device includes:
       pixels that generate signal charges through photoelectric conversion;
       vertical transfer portions at which packets that hold and transfer the signal charges are created; and
       vertical transfer electrodes of plural types that cover the vertical transfer portions and create the packets,
   the pixels include first pixels that are readout targets and second pixels that are not readout targets,
   the control circuit controls, for the first pixels, exposure operations of n types performed at different timings relative to the pulsed light, and reads out signal charges of n types to n packets at each of the vertical transfer portions out of the packets where n is an integer of at least 4, the signal charges of the n types being generated through the exposure operations of the n types, within a region in which the vertical transfer portions are disposed, a first region in which the n packets are created is adjacent to a pixel region in which m pixels are consecutively disposed in a vertical direction where m is an integer of at least 3, and the m pixels include at least one of the first pixels and at least one of the second pixels.

2. The distance measurement device according to claim 1, wherein n is at least 6, and m is at least 4.

3. The distance measurement device according to claim 1, wherein the control circuit generates a first exposure pulse to an n-th exposure pulse that are each combined with the pulsed light, time differences between the pulsed light and the first exposure pulse to the n-th exposure pulse increase in order from the first exposure pulse to the n-th exposure pulse, and in the exposure operations of the n types, the control circuit generates the first exposure pulse to the n-th exposure pulse in the order from the first exposure pulse to the n-th exposure pulse.

4. The distance measurement device according to claim 1, wherein the control circuit generates a first exposure pulse to an n-th exposure pulse that are each combined with the pulsed light, time differences between the pulsed light and the first exposure pulse to the n-th exposure pulse increase in order from the first exposure pulse to the n-th exposure pulse, and in the exposure operations of the n types, the control circuit generates the first exposure pulse to the n-th exposure pulse, by sequentially generating odd-numbered exposure pulses and sequentially generating even-numbered exposure pulses.

5. The distance measurement device according to claim 1, further comprising:

a signal processing circuit that calculates a distance value, based on n packet signals corresponding to the n packets output by the solid-state imaging device, wherein the signal processing circuit:

distinguishes a first packet signal and a second packet signal from among the n packet signals, the first packet signal corresponding to a portion of reflected light that includes a leading end of the reflected light, the second packet corresponding to a portion of the reflected light other than the portion that includes the leading end;

selects, from among the n packet signals, a first background light packet signal and a second background light packet signal each indicating a background light component;

subtracts the first background light packet signal from the first packet signal;

subtracts the second background light packet signal from the second packet signal; and calculates the distance value from a resultant first packet signal and a resultant second packet signal, the resultant first packet signal resulting from subtracting the first background light packet signal from the first packet signal, the resultant second packet signal resulting from subtracting the second background light packet signal from the second packet signal.

6. The distance measurement device according to claim 5, wherein the n packet signals are grouped into a first group and a second group where n is an even number, the first group including a packet signal corresponding to a packet that has passed through a predetermined readout electrode out of the n packets, the second group including a packet signal corresponding to a packet that has not passed through the predetermined readout electrode out of the n packets, and the signal processing circuit:

selects the first background light packet signal from a group to which the first packet signal belongs, out of the first group and the second group; and selects the second background light packet signal from a group to which the second packet signal belongs, out of the first group and the second group.

7. The distance measurement device according to claim 1, wherein the first pixels are infrared-light pixels that photoelectrically convert infrared light, and the second pixels are visible-light pixels that photoelectrically convert visible light.

8. The distance measurement device according to claim 7, wherein the pixels are included in first pixel rows and second pixel rows that are alternately disposed, the first pixel rows each include at least two infrared-light pixels that are one-dimensionally disposed, out of the infrared-light pixels, and the second pixel rows each include at least two visible-light pixels that are one-dimensionally disposed, out of the visible-light pixels.

9. The distance measurement device according to claim 8, wherein out of the vertical transfer portions, vertical transfer portions in predetermined columns each mix signal charges from two infrared-light pixels that are adjacent to each other in a row direction and included in a predetermined row out of the first pixel rows, in a readout operation on the first pixels, and vertical transfer portions in columns other than the predetermined columns each mix signal charges from two infrared-light pixels that are adjacent to each other in the row direction and included in a row other than the predetermined row out of the first pixel rows, in the readout operation on the first pixels, the predetermined columns are odd-numbered columns or even-numbered columns, and the predetermined row is an odd-numbered first pixel row or an even-numbered first pixel row in a group of the first pixel rows.

10. The distance measurement device according to claim 1, wherein the pixels are infrared-light pixels that photoelectrically convert infrared light.

11. The distance measurement device according to claim 10, wherein the first pixels belong to two pixel rows out of four pixel rows adjacent to one another in a column direction, the second pixels are pixels other than the first pixels that belong to the two pixel rows out of the four pixel rows, out of the vertical transfer portions, vertical transfer portions in predetermined columns each mix signal charges from two first pixels that are adjacent to each other in a row direction and included in a first predetermined pixel row, in a readout operation on the first pixels, and vertical transfer portions in columns other than the predetermined columns each mix signal charges from two first pixels that are adjacent to each other in the row direction and included in a second predetermined pixel row, in the readout operation on the first pixels, the predetermined columns are odd-numbered columns or even-numbered columns, the first predetermined pixel row is one of the two pixel rows, and the second predetermined pixel row is a remaining one of the two pixel rows.

12. A distance measurement method for use in a distance measurement device that includes a light source that emits pulsed light and a solid-state imaging device, the distance measurement method comprising:

determining first pixels that are readout targets and second pixels that are not readout targets;

controlling, for the first pixels, exposure operations of n types performed at different timings relative to the pulsed light where n is an integer of at least 4; and reading out signal charges of n types to n packets at a vertical transfer portion in the solid-state imaging device, the signal charges of the n types being generated through the exposure operations of the n types, wherein within a region in which the vertical transfer portion is disposed, a first region in which the n packets are created is adjacent to a pixel region in which m pixels are consecutively disposed in a vertical direction where m is an integer of at least 3, and the m pixels include at least one of the first pixels and at least one of the second pixels.

13. The distance measurement method according to claim 12, further comprising:

distinguishing a first packet and a second packet from among the n packets, the first packet holding a signal charge generated by a first portion of reflected light that includes a leading end of the reflected light, the second packet holding a signal charge generated by a portion of the reflected light other than the first portion;

selecting, from among the n packets, a first background light packet and a second background light packet each indicating a background light component;

subtracting the first background light packet from the first packet;

subtracting the second background light packet from the second packet; and calculating a distance value from a resultant first packet and a resultant second packet, the resultant first packet resulting from subtracting the first background light packet from the first packet, the resultant second packet resulting from subtracting the second background light packet from the second packet.

* * * * *